(12) United States Patent
Langhammer et al.

(10) Patent No.: US 10,871,946 B2
(45) Date of Patent: Dec. 22, 2020

(54) METHODS FOR USING A MULTIPLIER TO SUPPORT MULTIPLE SUB-MULTIPLICATION OPERATIONS

(71) Applicant: Intel Corporation, Santa Clara, CA (US)

(72) Inventors: Martin Langhammer, Alderbury (GB); Gregg William Baeckler, Santa Clara, CA (US); Sergey Gribok, Santa Clara, CA (US); Dmitry N. Denisenko, Toronto (CA); Bogdan Pasca, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 16/144,999

(22) Filed: Sep. 27, 2018

(65) Prior Publication Data

US 2019/0042198 A1   Feb. 7, 2019

(51) Int. Cl.
*G06F 7/544* (2006.01)
*G06F 7/483* (2006.01)

(52) U.S. Cl.
CPC .......... *G06F 7/5443* (2013.01); *G06F 7/483* (2013.01); *G06F 2207/3828* (2013.01)

(58) Field of Classification Search
CPC . G06F 7/5443; G06F 2207/3828; G06F 7/483
USPC ........................................................ 708/503
See application file for complete search history.

(56) References Cited

U.S. PATENT DOCUMENTS

| | | |
|---|---|---|
| 3,434,114 A | 3/1969 | Arulpragasam et al. |
| 4,893,268 A | 1/1990 | Denman et al. |
| 5,515,520 A | 5/1996 | Hatta et al. |
| 5,586,070 A * | 12/1996 | Purcell .................. G06F 7/5324 708/620 |
| 5,696,711 A | 12/1997 | Makineni |
| 5,909,385 A | 6/1999 | Nishiyama et al. |

(Continued)

FOREIGN PATENT DOCUMENTS

| | | |
|---|---|---|
| WO | 01-09712 | 2/2001 |
| WO | 2013-148619 | 10/2013 |

OTHER PUBLICATIONS

S.F. Oberman, "Floating Point Division and Square Rood Algorithms and Implementations in the AMD-K7 Microprocessor", Proc. 14th Symp. Computer Arithmetic (ARITH14), pp. 1106-115, Apr. 1999.

(Continued)

*Primary Examiner* — Tan V Mai
(74) *Attorney, Agent, or Firm* — Treyz Law Group, P.C.; Jason Tsai

(57) ABSTRACT

Integrated circuits with digital signal processing (DSP) blocks are provided. A DSP block may include one or more large multiplier circuits. A large multiplier circuit (e.g., an 18×18 or 18×19 multiplier circuit) may be used to support two or more smaller multiplication operations sharing one or two sets of multiplier operands, a complex multiplication, and a sum of two multiplications. If the multiplier products overflow and interfere with one another, correction operations can be performed. Partial products from two or more larger multiplier circuits can be used to combine decomposed partial products. A large multiplier circuit can also be used to support two floating-point mantissa multipliers.

24 Claims, 15 Drawing Sheets

(56) References Cited

U.S. PATENT DOCUMENTS

| | | | |
|---|---|---|---|
| 5,917,741 A | 6/1999 | Ng | |
| 6,480,872 B1 | 12/2002 | Choquette | |
| 7,318,080 B2 * | 1/2008 | Berkeman | G06F 7/5324 |
| | | | 708/625 |
| 7,948,267 B1 | 5/2011 | Mauer et al. | |
| 8,706,790 B1 | 4/2014 | Langhammer | |
| 8,949,298 B1 | 2/2015 | Langhammer | |
| 9,098,332 B1 | 8/2015 | Langhammer | |
| 9,104,474 B2 | 8/2015 | Kaul et al. | |
| 9,189,200 B1 | 11/2015 | Langhammer | |
| 9,600,235 B2 * | 3/2017 | Iyer | G06F 7/525 |
| 10,042,607 B2 | 8/2018 | Langhammer | |
| 2002/0194240 A1 | 12/2002 | Pangal et al. | |
| 2004/0254971 A1 | 12/2004 | Dirker et al. | |
| 2006/0117080 A1 | 6/2006 | Lutz et al. | |
| 2010/0023568 A1 | 1/2010 | Hickey et al. | |
| 2013/0007084 A1 | 1/2013 | Nystad | |
| 2014/0188968 A1 | 7/2014 | Kaul et al. | |
| 2015/0169289 A1 | 6/2015 | Tannenbaum et al. | |
| 2016/0062954 A1 | 3/2016 | Ruff et al. | |

OTHER PUBLICATIONS

K. Manolopoulos, D/ Reisis, V. Chouliaras, "An efficient multiple percision floating-pont multipler", Proc. 18th IEEE Int. Conf. Electron. Circuits Sust., pp. 153-156, 2011.

H/ Thapliyal, H.R. Arabnia, A.P. Vinod, "Combined integer and floating point multiplication architecture (CIFM) for FPGAs and its reversible logic implementation", Proceedings MWSCAS 2006, Aug. 2006.

\* cited by examiner

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| In1 | A | A | A | A | A | A | 0 | 0 | 0 | 0 | 0 | 0 | B | B | B | B | B | B | | | | | | | | | | | | | | | | | | |
| In2 | D | D | D | D | D | D | 0 | 0 | 0 | 0 | 0 | 0 | C | C | C | C | C | C | | | | | | | | | | | | | | | | | | |
| Out | AD | AD | AD | AD | AD | AD | AD | AD | AD | AD | AD | AD | AD | X | X | X | X | X | X | X | X | X | X | X | BC | BC | BC | BC | BC | BC | BC | BC | BC | BC | BC | BC |

A*D (indices 0-12)

B[0]*C[0]-overflow (AC+BD) (around index 24)

B*C (indices 24-35)

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| In1 | A | A | A | A | A | 0 | 0 | 0 | 0 | 0 | 0 | 0 | 0 | B | B | B | B | B | | | | | | | | | | | | | | | | | | |
| In2 | C | C | C | C | C | 0 | 0 | 0 | 0 | 0 | 0 | 0 | 0 | D | D | D | D | D | | | | | | | | | | | | | | | | | | |
| Out | AC | AC | AC | AC | AC | AC | AC | AC | AC | AC | 0 | 0 | 0 | AD+BC | AD+BC | AD+BC | AD+BC | AD+BC | AD+BC | AD+BC | AD+BC | AD+BC | AD+BC | AD+BC | 0 | 0 | BD | BD | BD | BD | BD | BD | BD | BD | BD | BD |

A*C ⟵ (Out 0–9)

A*D+B*C ⟵ (Out 13–23)

B*D ⟵ (Out 26–35)

FIG. 9A $$F*G = (abcd) * (xyzw)$$
$$= (abcd*xy) <<2 + (abcd*zw)$$

|   S   |   R   |   T   | Decimal |
|-------|-------|-------|---------|
| 0 0 0 | 0 0 0 | 0 0 0 | 0 |
| 0 0 0 | 0 0 1 | 0 0 1 | 1 |
| 0 0 0 | 0 1 0 | 0 1 0 | 2 |
| 0 0 0 | 0 1 1 | 0 1 1 | 3 |
| 0 0 0 | 1 0 0 | 1 0 0 | 4 |
| 0 0 0 | 1 0 1 | 1 0 1 | 5 |
| 0 0 0 | 1 1 0 | 1 1 0 | 6 |
| 0 0 0 | 1 1 1 | 1 1 1 | 7 |

| 0 0 1 | 0 0 0 | 1 1 1 | 7 |
| 0 0 1 | 0 0 1 | 0 0 0 | 0 |
| 0 0 1 | 0 1 0 | 0 0 1 | 1 |
| 0 0 1 | 0 1 1 | 0 1 0 | 2 |
| 0 0 1 | 1 0 0 | 0 1 1 | 3 |
| 0 0 1 | 1 0 1 | 1 0 0 | 4 |
| 0 0 1 | 1 1 0 | 1 0 1 | 5 |
| 0 0 1 | 1 1 1 | 1 1 0 | 6 |

| 0 1 0 | 0 0 0 | 1 1 0 | 6 |
| 0 1 0 | 0 0 1 | 1 1 1 | 7 |
| 0 1 0 | 0 1 0 | 0 0 0 | 0 |
| 0 1 0 | 0 1 1 | 0 0 1 | 1 |
| 0 1 0 | 1 0 0 | 0 1 0 | 2 |
| 0 1 0 | 1 0 1 | 0 1 1 | 3 |
| 0 1 0 | 1 1 0 | 1 0 0 | 4 |
| 0 1 0 | 1 1 1 | 1 0 1 | 5 |

Find T such that:
R = (S+T)mod8

FIG. 13C

METHODS FOR USING A MULTIPLIER TO SUPPORT MULTIPLE SUB-MULTIPLICATION OPERATIONS

BACKGROUND

This invention relates generally to integrated circuits and, in particular, to integrated circuits with multiplier circuitry.

Programmable logic devices (PLDs) include logic circuitry such as look-up tables (LUTs) and adder based logic that are designed to allow a user to customize the circuitry to the user's particular needs. This configurable logic is typically divided into individual logic circuits that are referred to as logic elements (LEs). The LEs may be grouped together to form larger logic blocks referred to as logic array blocks (LABs) that may be configured to share the same resources (e.g., registers and memory). In addition to this configurable logic, PLDs also include programmable interconnect or routing circuitry that is used to connect the inputs and outputs of the LEs and LABs. The combination of this programmable and routing circuitry is referred to as soft logic.

Besides soft logic, PLDs may also include specialized processing blocks that implements specific predefined logic functions and thus cannot be configured by the user. Such specialized processing blocks may include a concentration of circuitry on a PLD that has been partly or fully hardwired to perform one or more specific tasks, such as a logical or a mathematical operation. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), logic AND/NAND/OR/NOR arrays, etc., or combinations thereof.

One particularly useful type of specialized processing block that has been provided on PLDs is a digital signal processing (DSP) block. A conventional DSP block includes two 18-by-18 multipliers, which can be combined with other internal circuitry to serve as a 27-by-27 multiplier. The 27-by-27 multiplier is used as part of an IEEE 754 single precision floating-point multiplier, which requires 23 bits of precision.

Recent developments in artificial intelligence such as advancements in machine learning and deep learning involve training and inference, which have necessitated a much higher density of multiplications, especially at smaller precisions (i.e., multiplications with operands having less than 10 bits). As examples, machine learning inference might require performing a number of 3×3, 4×4, 5×5, or 6×6 multiplication operations. Supporting all of these modes could risk overly complicating a DSP block.

It is within this context that the embodiments described herein arise.

BRIEF DESCRIPTION OF THE DRAWINGS

FIG. 4 is a diagram showing how an 18×18 multiplier can be used to support two distinct 6×6 multiplications in accordance with an embodiment.

FIG. 5 is a diagram showing how an 18×18 multiplier can be used to support five 2×2 multiplications.

FIG. 6 is a diagram showing how an 18×18 multiplier can be used to support eight 2×2 multiplications in accordance with an embodiment.

FIG. 7 is a diagram showing how an 18×18 multiplier can be used to multiply two complex 5-bit inputs in accordance with an embodiment.

FIG. 8A is a diagram showing how an 18×18 multiplier can be used to support two 6×6 multiplications.

FIG. 8B is a diagram showing how an 18×18 multiplier can be used to support two 4×4 multiplications.

FIG. 9A is a diagram showing how an 18×18 multiplier can be used to support two 4×4 and two 4×2 multiplications in accordance with an embodiment.

FIG. 9B shows how a 4×4 multiplication can be decomposed into two 4×2 multiplications.

FIGS. 9C and 9D are diagrams showing how two 18×18 multipliers can be used to support six 4×4 multiplications in accordance with an embodiment.

FIG. 10A is a diagram showing how an 18×18 multiplier can be used to compute a sum from results of two distinct 5×6 multiplications in accordance with an embodiment.

FIG. 10B is a diagram showing how an 18×18 multiplier can be used to compute a sum from results of two distinct 6×6 multiplications in accordance with an embodiment.

FIG. 13B is a diagram of an illustrative lookup table that can be used to determine the most significant bits (MSBs) of a first mantissa result of the two floating-point mantissa multiplications shown in FIG. 13A in accordance with an embodiment.

FIG. 13C shows an equation that can be used to compute the MSBs of the first mantissa result in accordance with an embodiment.

DETAILED DESCRIPTION

The present embodiments relate to a programmable integrated circuit and in particular, how multiple smaller multipliers can be extracted from a larger multiplier within the programmable integrated circuit. The smaller multipliers can sometimes require a small amount of programmable soft logic. It will be recognized by one skilled in the art, that the present exemplary embodiments may be practiced without some or all of these specific details. In other instances, well-known operations have not been described in detail in order not to unnecessarily obscure the present embodiments.

Figure 1:
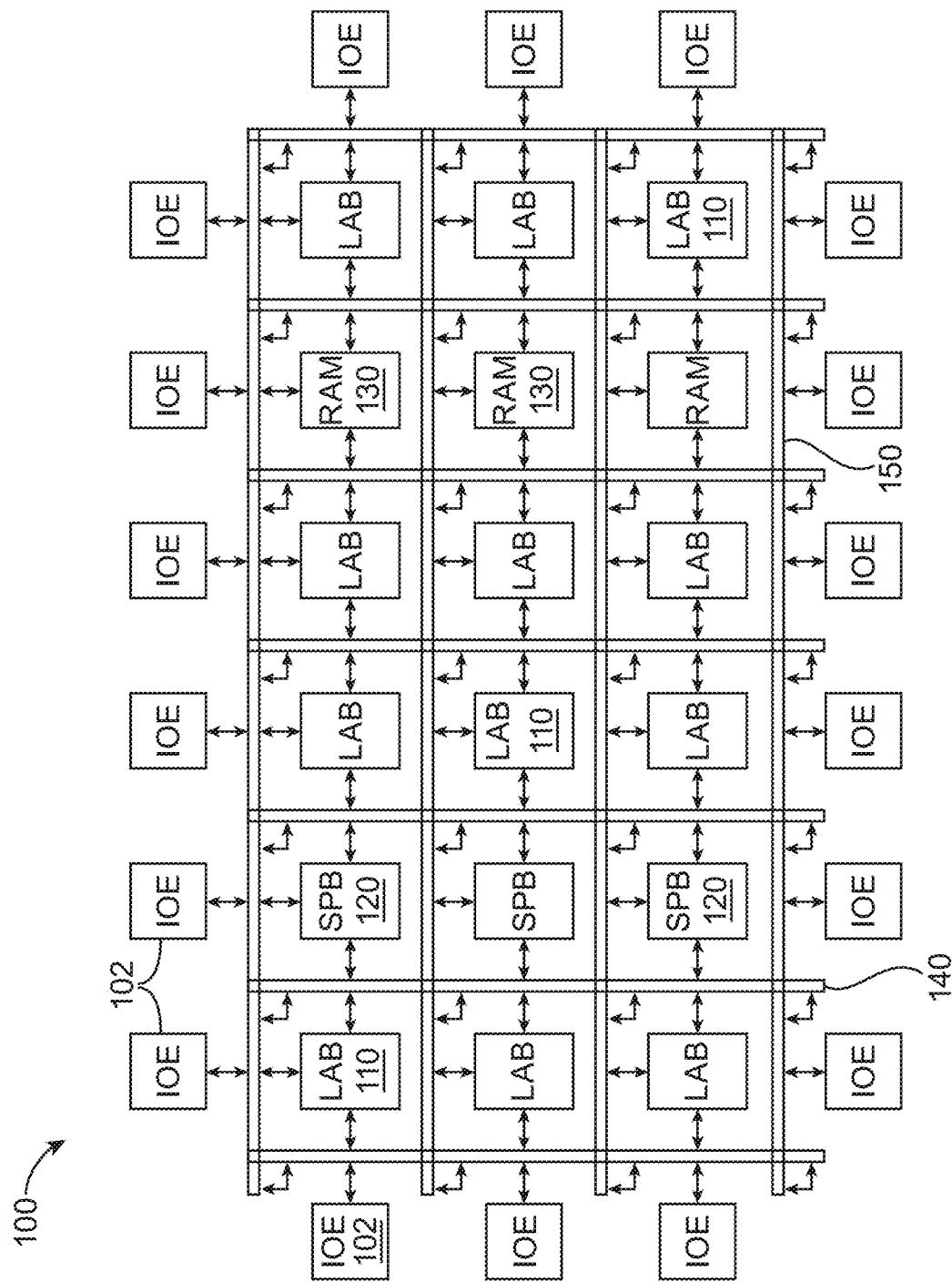
FIG. 1 is a diagram of an illustrative programmable integrated circuit in accordance with an embodiment.

An illustrative embodiment of an integrated circuit such as programmable logic device (PLD) 100 is shown in FIG. 1. As shown in FIG. 1, programmable logic device 100 may include a two-dimensional array of functional blocks, including logic array blocks (LABs) 110 and other functional blocks, such as random access memory (RAM) blocks 130 and specialized processing blocks such as specialized processing blocks (SPB) 120 that are partly or fully hardwired to perform one or more specific tasks such as mathematical/arithmetic operations. Functional blocks such as LABs 110 may include smaller programmable regions (e.g., logic elements, configurable logic blocks, or adaptive logic modules) that receive input signals and perform custom functions on the input signals to produce output signals. Device 100 may further include programmable routing fabric that is used to interconnect LABs 110 with RAM blocks 130 and specialized processing blocks 120 (sometimes referred to as digital signal processing or DSP blocks). The combination of the programmable logic and routing fabric is sometimes referred to as "soft" logic, whereas the DSP blocks are sometimes referred to as "hard" logic.

Programmable logic device 100 may contain programmable memory elements for configuring the soft logic. Memory elements may be loaded with configuration data (also called programming data) using input/output elements (IOEs) 102. Once loaded, the memory elements provide corresponding static control signals that control the operation of one or more LABs 110, programmable routing fabric, and optionally SPBs 120 or RAMS 130. In a typical scenario, the outputs of the loaded memory elements are applied to the gates of metal-oxide-semiconductor transistors (e.g., pass transistors) to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), programmable metallization cells (PMCs), conductive-bridging RAM (CBRAM), combinations of these structures, etc. Because the memory elements are loaded with configuration data during programming, the memory elements are sometimes referred to as configuration memory, configuration RAM (CRAM), configuration memory elements, or programmable memory elements.

In addition, programmable logic device 100 may have input/output elements (IOEs) 102 for driving signals off of device 100 and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The routing fabric (sometimes referred to as programmable interconnect circuitry) on PLD 100 may be provided in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, routing wires may be shorter than the entire length of the routing channel. A length L wire may span L functional blocks. For example, a length four wire may span four functional blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1, where input and output connections are present on three sides of each functional block to the routing channels. Other routing architectures may also be used. Examples of other routing architectures include 1-sided, 1½-sided, 2-sided, and 4-sided routing architectures. If desired, the routing topology may optionally include diagonal wires, horizontal wires, and vertical wires as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
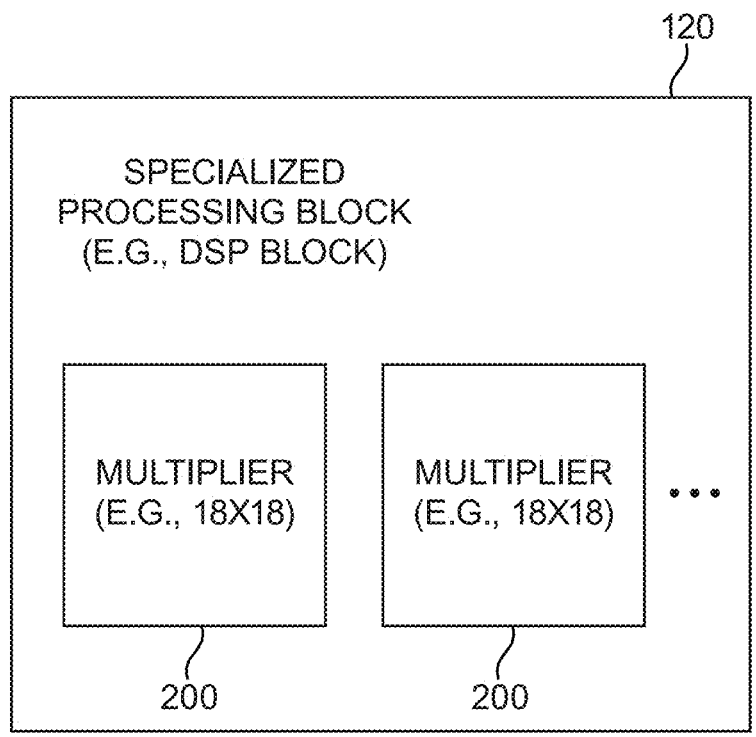
FIG. 2 is a diagram of an illustrative specialized processing block in accordance with an embodiment.

FIG. 2 is a diagram of a specialized processing block 120 (sometimes referred to as a digital signal processing block or "DSP" block). DSP block 120 (sometimes also referred to as a multiply-accumulate block) may include a concentration of circuitry that has been partially or fully hardwired to perform one or more specific tasks, such as a logical or a mathematical operation (e.g., a multiply operation, an add operation, a sum-of-products operation, a dot-vector operation, etc.). DSP block 120 may also contain one or more specialized structures such as an array of configurable storage elements. Examples of structures that may be implemented in DSP block 120 include: multipliers, adders, accumulators, arithmetic logic units (ALUs), barrel-shifters, various memory elements (such as FIFO/LIFO/SIPO/RAM/ROM/CAM blocks and register files), logic AND/NAND/OR/NOR arrays, etc., or combinations thereof. Storage elements within DSP block 120 may serve different purposes than configuration memory. For instance, storage elements within DSP block 120 may store coefficients for implementing FIR filters, Fourier transforms (e.g., fast Fourier transforms), or other polynomial functions. Alternatively, storage elements within DSP block 120 may be used to pipeline a critical path or to synchronize data before it is processed.

As shown in FIG. 2, DSP block 120 may include at least first and second multiplier circuits 200. As an example, multiplier circuits 200 may each be an 18-by-18 multiplier circuit, which can be combined into a larger 27-by-27 multiplier to support an IEEE 754 single precision floating-point multiplication operation (as an example). If desired, DSP block 120 may include additional multipliers 200.

Figure 3:
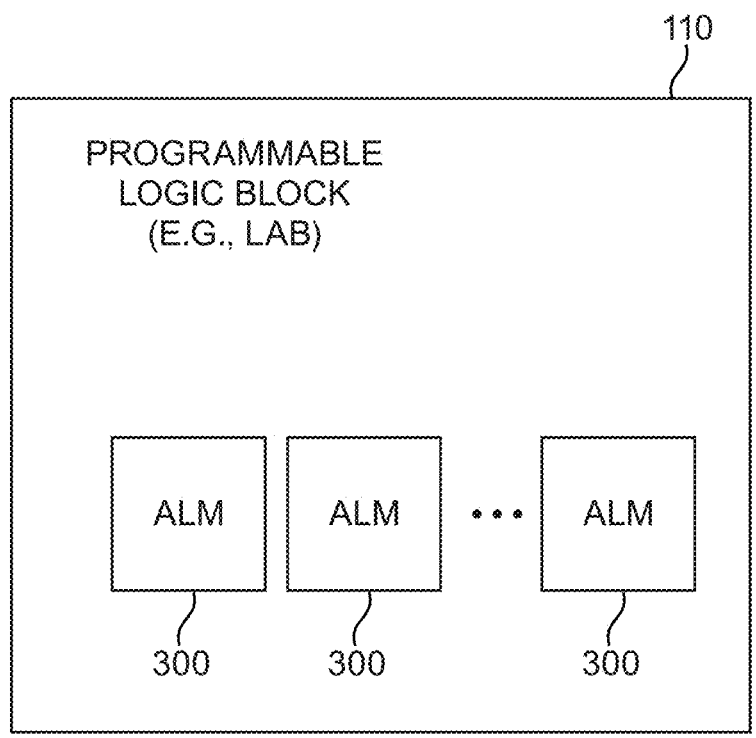
FIG. 3 is a diagram of an illustrative programmable logic block in accordance with an embodiment.

FIG. 3 is a diagram of an illustrative programmable logic block such as LAB 110. LAB 110 may include a smaller subset of LABs that is operable to access memory and that is therefore sometimes referred to as memory LABs ("MLABs"). LAB 110 may have associated input selection circuitry and output selection and driver circuitry. The input selection circuitry may include LAB input multiplexers (LIMs) configured to select one or more of the input signals to provide to programmable logic block 110. The output selection and driver circuitry may include driver input multiplexers (DIMs) that can be used to select signals from a horizontal channel, a vertical channel, and local outputs and to drive wires, which originate in that logic block 110 and route to other logic blocks.

As shown in FIG. 3, LAB 110 may include smaller regions of programmable logic that include combinational logic. The smaller programmable logic regions 300 within each programmable logic region 110 are sometimes referred to as adaptive logic modules (ALMs) or logic elements (LEs). Logic modules 300 may include lookup table and register circuitry and may receive the input signals that are selected by the input selection circuitry and may perform custom functions on the input signals to produce output signals. The input signals received by each logic module 300 may overlap with input signal portions received by other logic modules 300 (e.g., some of the input signals received by a first logic region 300 may also be received by a second logic region 300). There may be any suitable number of ALMs 300 within logic block 110.

In accordance with an embodiment, multipliers 200 within DSP block 120 (FIG. 2) may be used to support multiple smaller multiplications, which can help increase the functional density of DSP block 120. The configuration in which DSP block 120 includes two 18×18 multipliers are sometimes described herein as an example. In general, any number of smaller sub-multipliers can be extracted from the two larger 18×18 multiplier circuits optionally using one or more ALMs. Most of these cases will be described using a single 18×18 multiplier, which is only a portion of DSP block 120 (e.g., half of a DSP block).

FIG. 4 is a diagram showing how an 18×18 multiplier circuit can be used to support two independent 6×6 multiplications. In general, any two N×N multipliers can be extracted from any 3N×3N multiplier (e.g., two 8×8 multipliers can be extracted from a 24×24 multiplier, two 10×10 multipliers can be extracted from a 30×30 multiplier, etc.)

As shown in FIG. 4, an 18×18 multiplier has a first input (In1) and a second input (In2) that are each capable of receiving up to 18 bits (i.e., from index 0 to 17). To implement two 6×6 multiplications, indices [5:0] of In1 are configured to receive input signals A, indices [17:12] of In1 are configured to receive input signals B, indices [5:0] of In2 are configured to receive input signals D, and indices [17:12] of In2 are configured to receive input signals C. The remaining indices [11:6] of In1 and In2 are populated with zeroes. Configured in this way, the bits of product A*D will populate indices [11:0] at the final output (Out) of the larger 18×18 multiplier circuit, whereas the bits of product B*C will populate indices [35:24] at final output Out.

The "X" values at indices [23:13] of the output are don't care bits in this context and are ignored. These don't care bits, however, are actually the result of (A*C+B*D), which may cause an overflow into the least significant bit (LSB) of B*C at output index 24. One way of handling this is just to ignore this error, which may be tolerable if the full output precision of B*C may not be needed or used.

Depending on the number of most significant bits (MSBs) used from B*C, an error may be propagated into the used portion. This error can be mitigated as follows. The LSB of B*C is equal to the logic AND function of the LSB of input B and the LSB of input C (i.e., B[0]&C[0]). If the output bit at index 24 (i.e., BC[0]) is not equal to B[0]&&C[0], then the overflow from X has propagated into B*C, and a "1" can be subtracted from B*C. This is a fairly inexpensive solution. Typically, products generated in this way may feed into a subsequent summation stage (e.g., an adder tree or an accumulator), which gather signals from various multiplier outputs, or a threshold detection logic (e.g., a hyperbolic function). In such types of following logic levels, a carry chain (e.g., an embedded adder) may be unused. In other cases, the following logic may be converted from a signed magnitude number into a signed number, in which case the carry chain is being used. However, the carry in can be inverted in case there is an overflow detected in the multiplier output.

As described above, the subtractive correction of B*C is needed when there is an overflow from (A*C+B*D). This overflow can be eliminated if we limit the computation for one or both of the smaller multipliers to a 5×5 multiplication (i.e., A*D and/or B*C is limited to a 5×5 operation), or if we limit the computation for one or both of the smaller multipliers to a 5×6 or a 6×5 multiplication (i.e., A*D and/or B*C is limited to a 5×6 or 6×5 operation). Note that these sub-multipliers can be unsigned or signed. In the signed multiplier case, the original 18×18 multiplier should be able to support signed numbers. In such scenarios, only the MSB multiplier (e.g., the smaller multiplier calculating B*C) can be signed while the LSB multiplier (e.g., the smaller multiplier calculating A*D) will be unsigned.

Figures 5, 6:
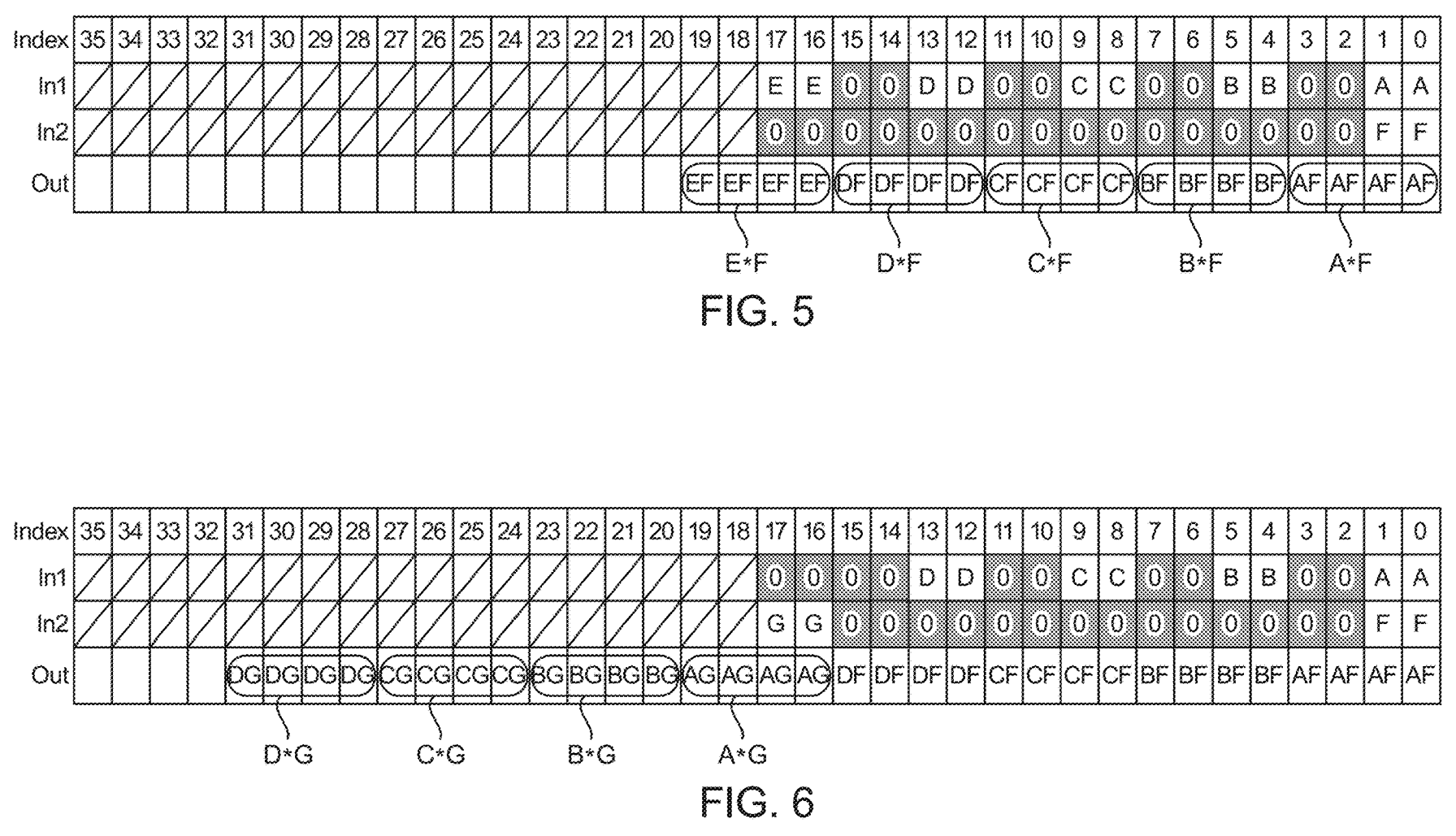

FIG. 5 is a diagram showing how an 18×18 multiplier circuit can be used to support five independent 2×2 multiplications. As shown in FIG. 5, indices [1:0] of In1 are configured to receive input signals A, indices [5:4] of In1 are configured to receive input signals B, indices [9:8] of In1 are configured to receive input signals C, indices [13:12] of In1 are configured to receive input signals D, indices [17:16] of In1 are configured to receive input signals E, and indices [1:0] of In2 are configured to receive input signals F. The remaining indices of In1 and In2 are populated with zeroes. Configured in this way (e.g., by inserting a pair of "0s" between A, B, C, D, and E), the bits of product A*F will populate indices [3:0] at the final output of the larger 18×18 multiplier circuit; the bits of product B*F will populate indices [7:4] at the output; the bits of product C*F will populate indices [11:8] at the output; the bits of product D*F will populate indices [15:12] at the output; and the bits of product E*F will populate indices [19:16] at the output. The MSBs [35:20] of the output are unused.

FIG. 6 is a diagram showing how an 18×18 multiplier circuit can be used to support eight independent 2×2 multiplications. As shown in FIG. 6, indices [1:0] of In1 are configured to receive input signals A, indices [5:4] of In1 are configured to receive input signals B, indices [9:8] of In1 are configured to receive input signals C, indices [13:12] of In1 are configured to receive input signals D, indices [1:0] of In2 are configured to receive input signals F, and indices [17:16] of In2 are configured to receive input signals G. The remaining indices of In1 and In2 are populated with zeroes.

By inserting a pair of "0s" between A, B, C, and D and by positioning G at [17:16] of In2, there will be four sets of multiplicands (A, B, C, D) and two sets of multipliers (F, G).

In other words, multiplier F will be shared among A-D, and multiplier G will also be shared among A-D. As a result, the bits of product A*F will populate indices [3:0] at the final output of the larger 18×18 multiplier circuit; the bits of product B*F will populate indices [7:4] at the output; the bits of product C*F will populate indices [11:8] at the output; the bits of product D*F will populate indices [15:12] at the output; the bits of product A*G will populate indices [19:16] at the output; the bits of product B*G will populate indices [23:20] at the output; the bits of product C*G will populate indices [27:24] at the output; and the bits of product D*G will populate indices [31:28] at the output. The MSBs [35:32] of the output are unused. Having two sets of multipliers F and G as shown in FIG. 6 can help increase the functional density of the larger multiplier circuit (e.g., the multiplier density of FIG. 6 is increased by 60% relative to that of FIG. 5).

In the case of FIGS. 5 and 6, all of the smaller multiplications can be unsigned, and a small subset of them can be signed if one or both of the inputs are in the MSBs of the larger multiplier. For example, in FIG. 5, product E*F can be signed, which would require indices [17:12] at In2 to be sign extensions of F. In FIG. 6, product D*G can be signed, which would require indices [17:14] at In1 to be sign extensions of D.

FIG. 7 is a diagram showing how an 18×18 multiplier can be used to implement a complex multiplier. In the example of FIG. 7, the 18×18 multiplier may be used to compute (A+Bj)*(C+Dj), where A, B, C, and D are all 5 bits. Relative to the setup of FIG. 5 having 6-bit input operands, FIG. 7 has only 5-bit inputs, so there is no issue of overflow. The resulting product will be (A*C−B*D)+(A*D+B*C)j, where (A*C−B*D) represents the real part of the product and where (A*D+B*C) represents the imaginary part of the product. To implement this complex multiplication, indices [4:0] of In1 are configured to receive input signals A, indices [17:13] of In1 are configured to receive input signals B, indices [4:0] of In2 are configured to receive input signals C, and indices [17:13] of In2 are configured to receive input signals D. The remaining indices [12:5] of In1 and In2 are populated with zeroes. Configured in this way, the bits of product A*C will populate indices [9:0] at the final output, the bits of product B*D will populate indices [35:26] at the output, and the bits of (A*D+B*C) will populate indices [23:13] at the output. The MSB bits can be subtracted from the LSB bits to compute the real portion of the product, whereas the intermediate indices [23:13] represent the imaginary portion of the product.

One issue with the extraction of the smaller multiplication is that A and C inputs are in the unsigned form. If the number system is signed, then A and C has to be converted to signed magnitude numbers prior to multiplication. This is fairly inexpensive to implement since an unused carry chain may exist in a balancing register before the DSP block. If A and C are converted to signed magnitude, inputs B and D should also be converted to signed magnitude.

If desired, the 18×18 can also support a 6-bit complex multiplication. The methods described in connection with FIG. 5 to correct the overflow in the MSB sub-multiplier output can be used. This same method can also be used to restore the MSB of the middle sub-multiplier (i.e., the middle multiplier computing the imaginary portion), such as by comparing the expected LSB of the B*D multiplier with the actual output LSB.

Figures 8A, 8B:
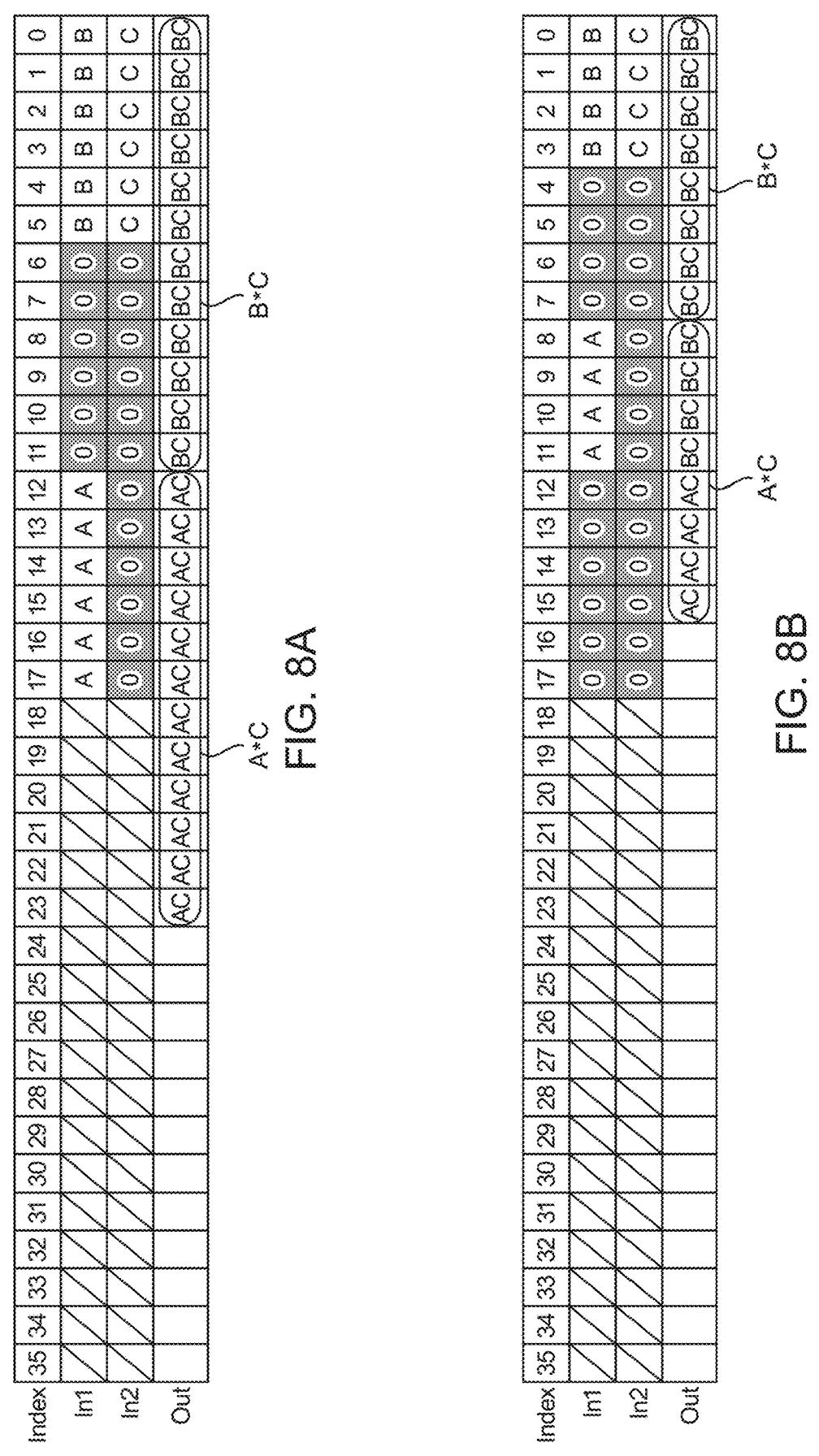

FIG. 8A is an example showing how two 6×6 multipliers can be extracted from an 18×18 multiplier. To implement two 6×6 multiplications, indices [5:0] of In1 are configured to receive input signals B, indices [17:12] of In1 are configured to receive input signals B, and indices [5:0] of In2 are configured to receive input signals C. The remaining indices of In1 and In2 are populated with zeroes. Configured in this way, input C serves as a shared multiplier operand, and the bits of product B*C will populate indices [11:0] at the output, whereas the bits of product A*C will populate indices [23:12] at the output. Due to the particular spacing of input bits, there is no overflow interference or error between the two products.

FIG. 8B is an example showing how two 4×4 multipliers can be extracted from an 18×18 multiplier. To implement two 4×4 multiplications, indices [3:0] of In1 are configured to receive input signals B, indices [11:8] of In1 are configured to receive input signals A, and indices [3:0] of In2 are configured to receive input signals C. The remaining indices of In1 and In2 are populated with zeroes. Configured in this way, input C serves as a shared multiplier operand, and the bits of product B*C will populate indices [7:0] at the output, whereas the bits of product A*C will populate indices [15:8] at the output. Due to the particular spacing of input bits, there is no overflow interference between the two products.

In the example of FIG. 8A, output indices [35:24] are unused. In the example of FIG. 8B, output indices [35:16] are unused. In other words, such extractions are not efficient uses of the larger multiplier. To increase the packing efficiency of an 18×18 multiplier, at least some of the remaining input bits can be used to create additional partial products.

Figures 9A, 9B:
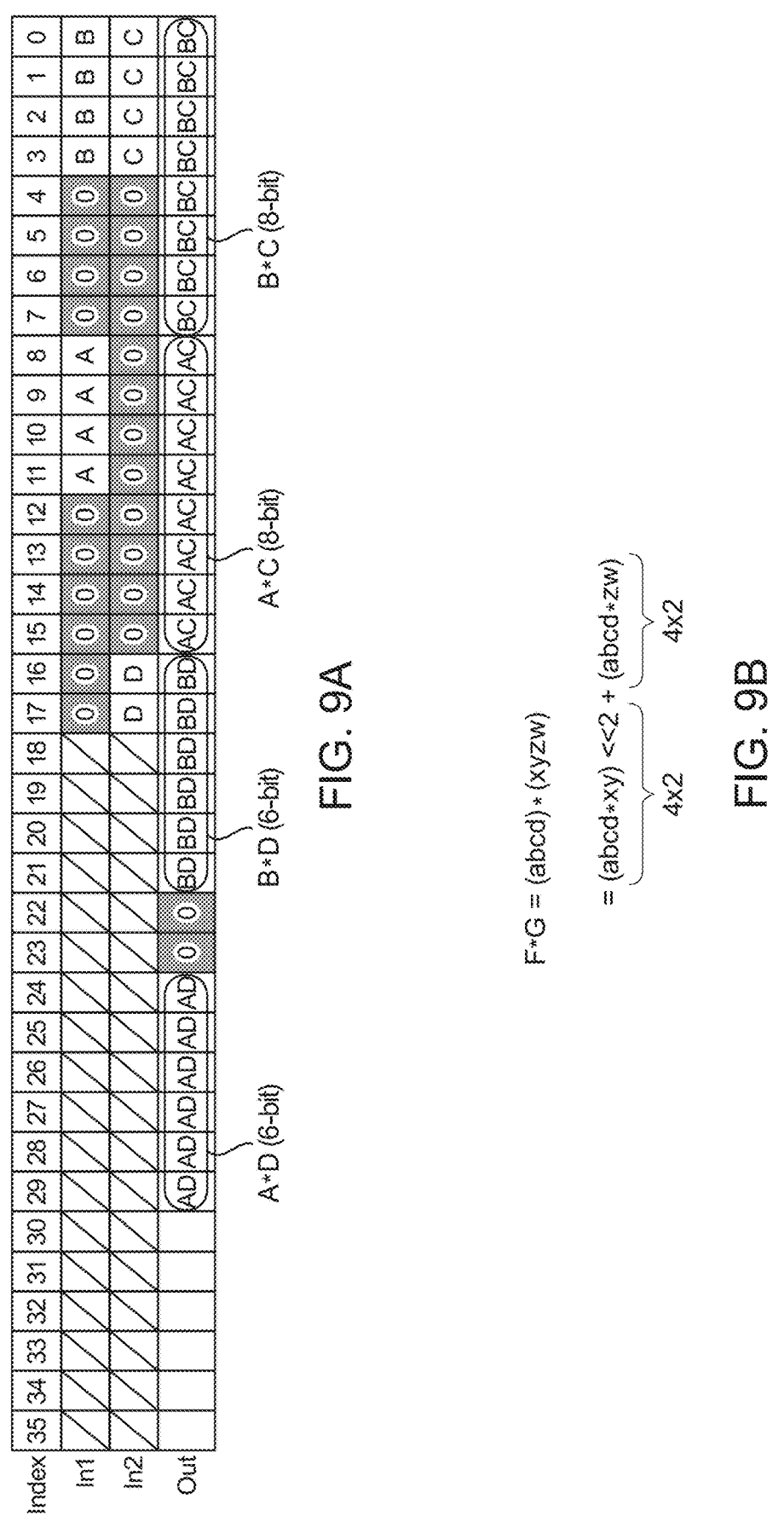

FIG. 9A is a diagram showing how an 18×18 multiplier can be used to support two 4×4 and two 4×2 multiplications. As shown in FIG. 9A, indices [3:0] of In1 are configured to receive input signals B, indices [11:8] of In1 are configured to receive input signals A, indices [3:0] of In2 are configured to receive input signals C, and indices [17:16] of In2 are configured to receive input signals D. The remaining indices of In1 and In2 are populated with zeroes.

Configured in this way, there will be two sets of multiplicands (A, B) and two sets of multipliers (C, D). In other words, 4-bit multiplier C will be shared among multiplicands A and B, whereas 2-bit multiplier D will be shared among multiplicands A and B. As a result, the eight bits of product B*C will populate indices [7:0] at the final output of the larger 18×18 multiplier circuit; the eight bits of product A*C will populate indices [15:8] at the output; the six bits of product B*D will populate indices [21:16] at the output; and the six bits of product A*D will populate indices [29:24] at the output. Having two sets of multipliers C and D as shown in FIG. 9A can help increase the functional density of the larger multiplier circuit. The products B*C and A*C are results of two 4×4 multiplications, whereas the partial products A*D and B*D are results of two 4×2 multiplications. Due to the particular spacing of input bits, there is no overflow interference/error among the four products.

In accordance with an embodiment, the two 4×2 partial products can then be assembled into a full 4×4 multiplier using embedded adders within one or more ALMs as follows. FIG. 9B shows how a 4×4 multiplication can be decomposed into two 4×2 multiplications. As shown in FIG. 9B, the desired computation is F*G, where F has a 4-bit representation of "abcd" and where G has a 4-bit representation of "xyzw". The resulting product is equal to the sum of (abcd*xy) left shifted by two and (abcd*zw). In other words, (abcd*xy) can be calculated using a first 4×2 partial product multiplier while (abcd*zw) can be calculated using a second 4×2 partial product multiplier. The upper bits of F*G can be computed using a 6-bit adder, and there is no overflow issue here.

Figures 9C, 9D:
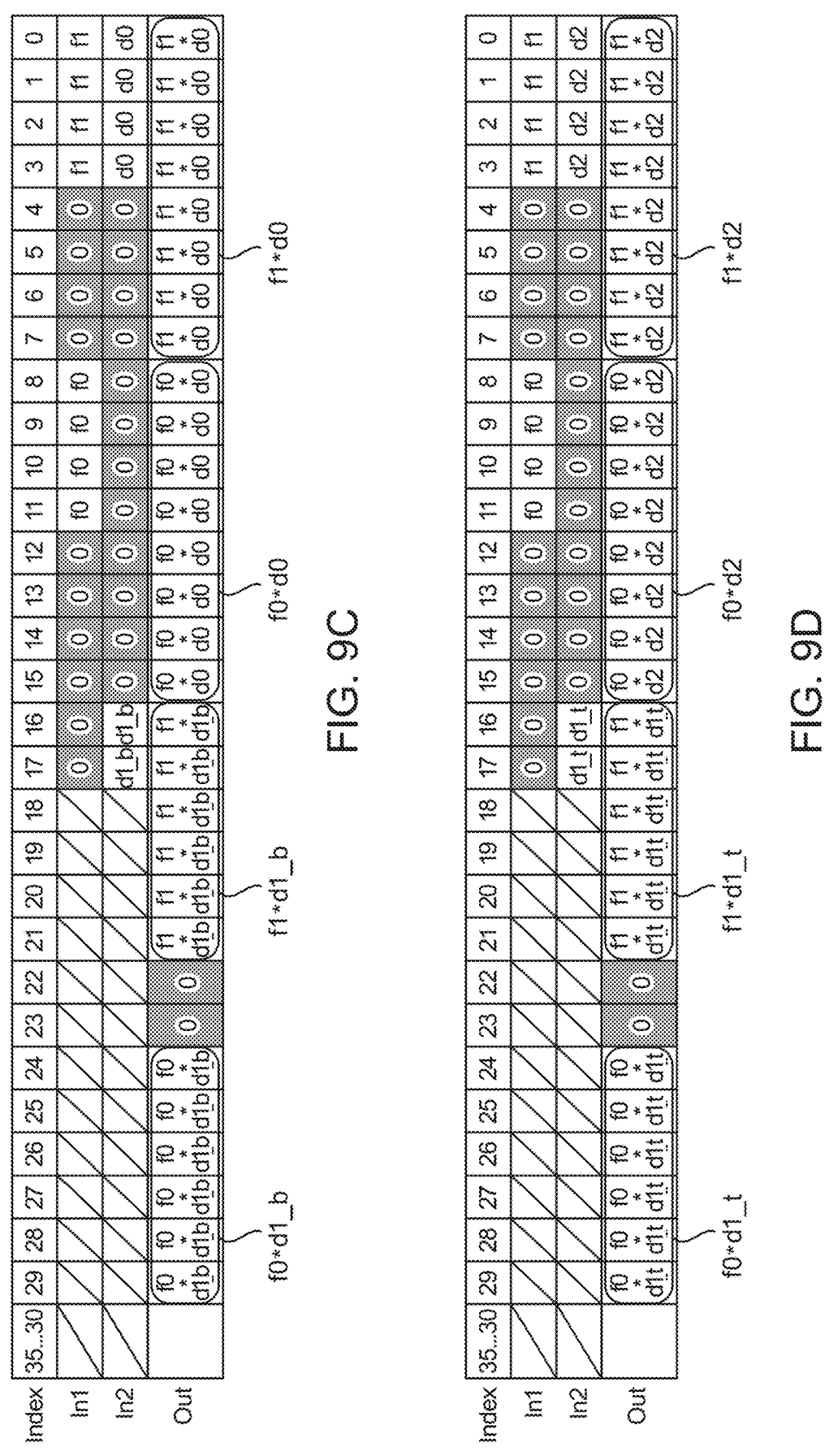

The two 4×4 and the two 4×2 multipliers generated by a single 18×18 multiplier as shown in FIG. 9A are not particularly useful by themselves. However, distributing the multiplier components across multiple 18×18 multipliers and then combining them in soft logic will maximize the efficiency of the overall multiplier functionality. FIGS. 9C and 9D are diagrams showing how two 18×18 multipliers can be used to support six 4×4 multiplications: f0*d0, f1*d0, f0*d1, f1*d1, f0*d2, f1*d2, where all the f and d values are 4-bit unsigned numbers. This computation can arise from trying to compute an array of six multiplications comprising three data values (d0, d1, d2) with two filters (f0, f1).

To compute all six multiplications, f0, f1, d0, and d1_b (i.e., the bottom two LSBs of d1) can be provided as inputs to a first 18×18 multiplier as shown in FIG. 9C. Configured in the way shown in FIG. 9C, eight bits of product f1*d0 will populate indices [7:0] at the final output; the eight bits of product f0*d0 will populate indices [15:8] at the output; the six bits of product f1*d1_b will populate indices [21:16] at the output; and the six bits of product f0*d1_b will populate indices [29:24] at the output.

Furthermore, f0, f1, d2, and d1_t (i.e., the top two MSBs of d1) can be provided as inputs to a second 18×18 multiplier as shown in FIG. 9D. Configured in the way shown in FIG. 9D, eight bits of product f1*d2 will populate indices [7:0] at the final output; the eight bits of product f0*d2 will populate indices [15:8] at the output; the six bits of product f1*d1_t will populate indices [21:16] at the output; and the six bits of product f0*d1_t will populate indices [29:24] at the output.

The first large 18×18 multiplier of FIG. 9C and the second large 18×18 multiplier of FIG. 9D may be processed in parallel. Partial products f1*d1_b from the first 18×18 multiplier and f1*d1_t from the second 18×18 multiplier may be combined using a 6-bit ALM-based adder to compute full 8-bit product f1*d1. Similarly, partial products f0*d1_b from the first 18×18 multiplier and f0*d1_t from the second 18×18 multiplier may be combined using a 6-bit ALM-based adder to compute full 8-bit product f0*d1. Operated in this way, the total cost to extract six 4×4 sub-multipliers is two 18×18 multipliers and six ALMs.

Referring back to the embodiment of FIG. 7, an alternate use of the complex multiplier is to implement the sum of two multipliers (e.g., A*D+B*C). There is no overflow issue here since the input operands are only five bits wide. The same caveats associated with the complex multiplier also apply here. One issue with the extraction of the smaller multiplication is that A and C inputs are in the unsigned form. If the number system is signed, then A and C has to be converted to signed magnitude numbers prior to multiplication. This is fairly inexpensive to implement since an unused carry chain may exist in a balancing register before the DSP block. If A and C are converted to signed magnitude, inputs B and D should also be converted to signed magnitude.

Figures 10A, 10B:
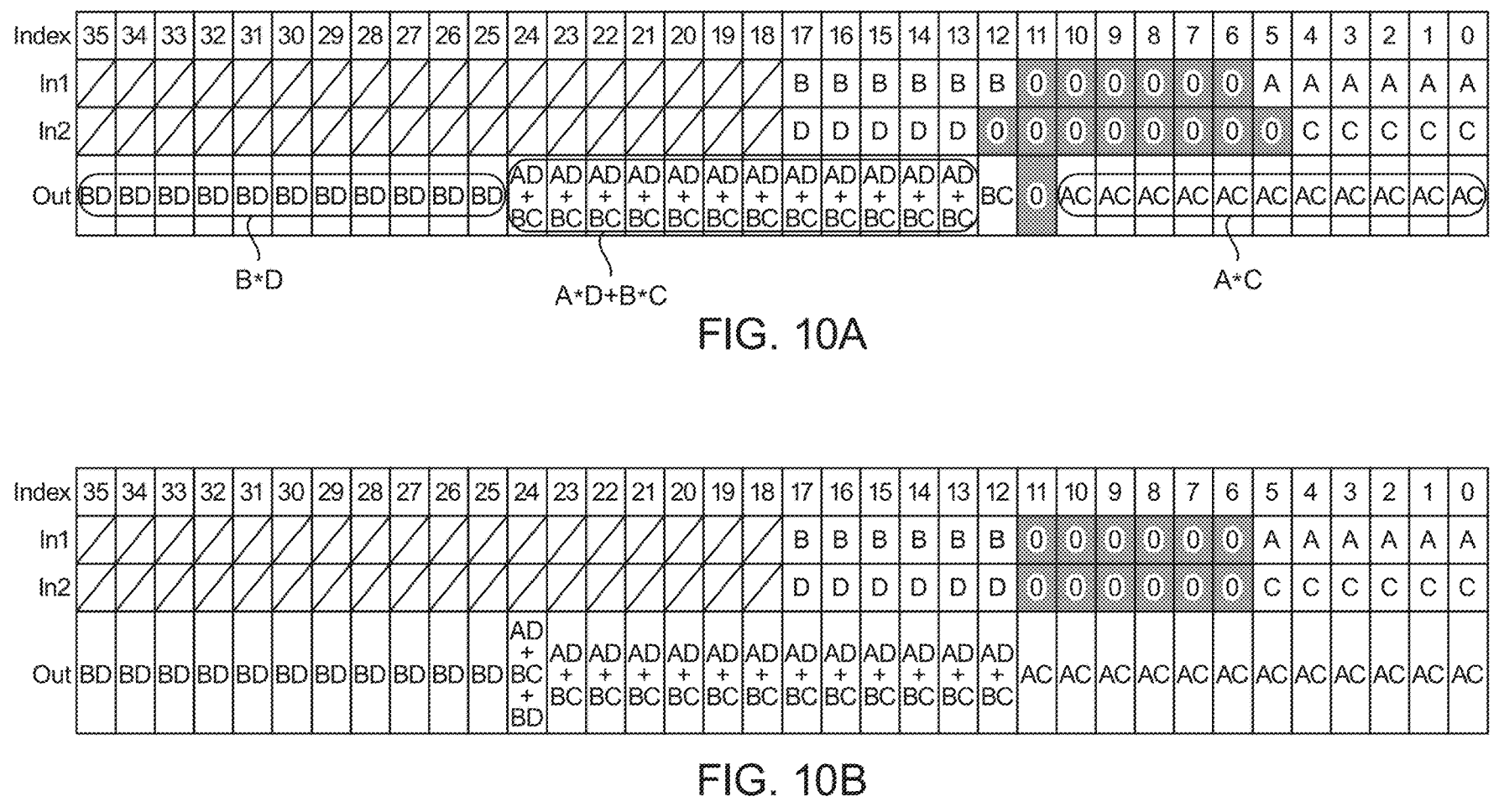

In the case of 5×6 multipliers, 6-bit inputs A and B and 5-bit inputs C and D may be fed into an 18×18 multiplier circuit in the way shown in FIG. 10A. The resulting bits of product A*C will populate indices [10:0] at the output; the resulting bits of product B*D will populate indices [35:25] at the output; and the resulting bits of sum (A*D+B*C) will populate indices [24:13]. Since both multipliers C and D are 5-bit inputs, there is no issue of overflow here. Note that A*D and B*C are offset by one bit, so the sum is not useful here.

Alternatively, full 6×6 multipliers can also be extracted (see, e.g., FIG. 10B). As shown in FIG. 10B, all input operands A, B, C, and D are 6-bits. The resulting bits of product A*C will populate indices [11:0] at the output; the resulting bits of product B*D will populate indices [35:24] at the output; and the resulting bits of sum (A*D+B*C) will populate indices [24:12]. Note that the LSB of B*D also contains the potential overflow from (AD+BC) (e.g., the middle sum can overflow to 13 bits and correct B*D).

As described above in connetion with FIG. 4, the expected LSB of B*D can be easily calculated by computing the logical AND of the LSB of input B and the LSB of input D (i.e., B[0]&D[0]). Therefore, if the output bit at index [24] is not what is expected (e.g., if the [24] output bit is not equal to B[0]&D[0]), then it means that a "1" has overflowed from (AD+BC). If there is an overflow, the MSB of (AD+BC) will be set to a "1" and then correct the LSB of B*D. If the output bit [24] is a "1" (still assuming overflow exists), we know the LSB should be "0" and can just output a "0". If the output bit [24] is a "0" (still assuming overflow exists), then the LSB is a "1". This is not as simple as just outputting a "1" since the addition of the overflowing "1" bit may have created a carry far into the B*D value.

For example, consider a scenario in which the value of B*D should be "000010111111". Adding an overflow "1" to "000010111111" would create "000011000000". The proper way to correct this would be to subtract "1" from "000011000000" to obtain the correct value of B*D. Using a 12-bit adder at every embedded multiplier to perform this subtract by "1" is fairly expensive. Optional ways of implementing this subtraction is to use a smaller adder for just a subset of the LSBs (e.g., for only 2, 3, 4, 5, or 6 LSBs of B*D). In other words, the overflow is only partially corrected by a subtractor that is smaller than the precision/bitwidth of the sub-multiplier output. This would, however, still result in an occasional error.

The overall flow for computing the correct value of B*D and the MSB of (AD+BC) is as follows. At a first step, the LSB of B*D is calculated by computing B[0]*C[0]. At a second step, the calculated LSB from the first step is XORed (i.e., an exclusive-OR operation) with the output bit [24]. The result of the XOR operation is equal to the MSB of (AD+BC). The result of the XOR operation is also subtracted from output bits [35:24] to obtain the corrected value of B*D.

In many applications, multiple B*D values will be summed together. In such cases, all the errors could be counted using a population count circuit, and then a single adder at the end (or at any point of the summation tree) can be used to correct all the errors at once. The overall flow for computing the correct value of B*D and the MSB of (AD+BC) when multiple BDs summed is as follows. At a first step, the LSBs of the different $BD_x$ are calculated by computing $B_x[0]*C_x[0]$, where x represents the index of operand pairs. At a second step, the calculated LSBs from the first step is XORed (i.e., an exclusive-OR operation) with the respective output bit [24]. At a third step, the results of the XOR operations are equal to the respective MSBs of $(A_xD_x+B_xC_x)$. At a fourth step, the unary vector of the XOR bits are converted to a binary value (e.g., using a population count circuit). At a fifth step, all the $B_x*D_x$ values are summed together. At a sixth step, the binary value of the XOR bits (computed at the fourth step) may be subtracted from the sum of $B_x*D_x$ (computed at the fifth step).

Figure 11:
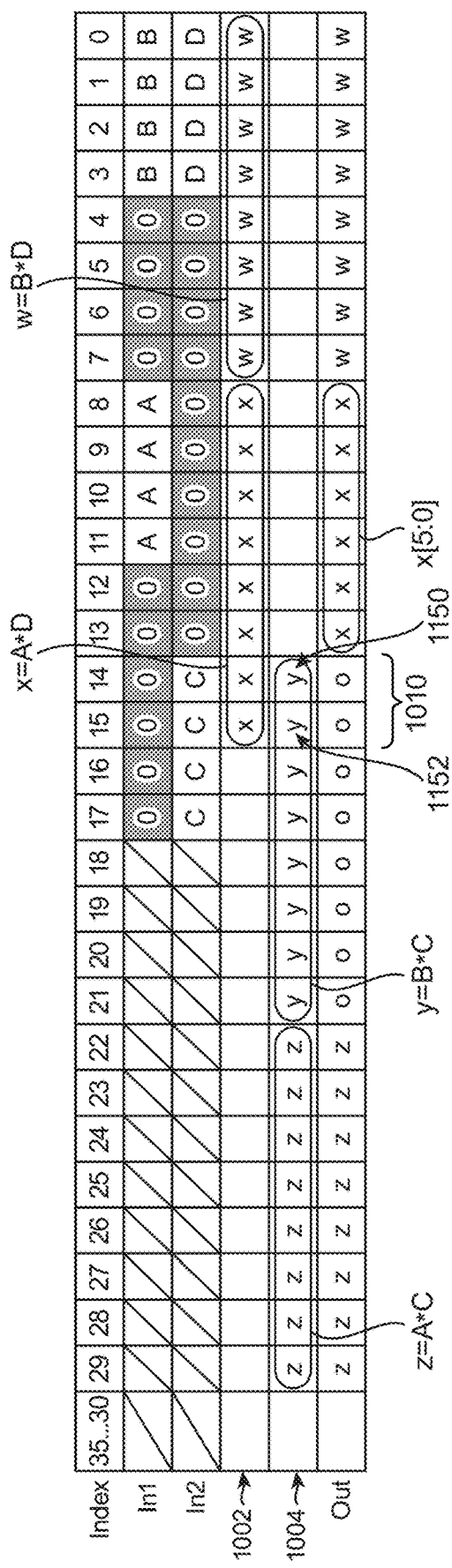
FIG. 11 is a diagram showing how an 18×18 multiplier can be used to support four 4×4 multiplications in accordance with an embodiment.

In accordance with another suitable arrangement, a larger multiplier can be used to support smaller multipliers that intersect or partially overlap, where the correct products can be restored using additional logic cells. FIG. 11 is a diagram showing how an 18×18 multiplier circuit can be used to support four 4×4 multipliers using five ALMs (as an example). As shown in FIG. 11, indices [3:0] of In1 are configured to receive input signals B, indices [11:8] of In1 are configured to receive input signals A, indices [3:0] of In2 are configured to receive input signals D, and indices [17:14] of In2 are configured to receive input signals C. The remaining indices of In1 and In2 are populated with zeroes.

Configured in this way, bits w (which represent the product of B*D), bits x (which represent the product of A*D) as shown in row 1002, bits z (which represent the product of A*C), and bits y (which represent the product of B*C) as shown in row 1004 are generated at their respective bit indices. Note that the x and y bits at least partially overlap at bit indices marked by bracket 1010. The w bits representing the product of B*D are unaffected and can be taken directly from the output of the 18×18 multiplier circuit. Similarly, the z bits representing the product of A*C are unaffected and can also be taken directly from the output of the larger multiplier. Note that a carry in to the z bits may occur if an overflow occurs from the sum of the y bits and the two MSBs of x. However, the y bits cannot exceed 225 since the 4-bit input operands have a maximum value of 15 each, and the two MSBs of x has a maximum value of 3. The resulting sum of 225+3=228 can be sufficiently encoded using eight bits without an overflow since an 8-bit number can encode up to 255.

However, since there is an overlap between the x and y bits, the middle output bits will have to be adjusted to produce the correct x and y vectors. First, the bottom six bits of x (i.e., x[5:0]) are unaffected and can be taken directly from the multiplier outputs. However, the top two MSBs of x (i.e., x[7:6]) still need to be calculated. Since we know that the LSB 1150 of the y vector is B[0]&C[0] and the second LSB 1152 of the y vector is (C[0]&B[1]) XORed with (C[1]&B[0]), the missing bits of vectors x and y can be computed as follows:

$$\{y[7:2], x[7:6]\} = o[21:14] - \{y[1:0]\} \quad (1)$$

where o represents the actual output bits of the multiplier, where y[0] is the computed LSB 1150 (e.g., B[0]&C[0]), and where y[1] is the computed second LSB 1152 (e.g., (C[0]&B[1])⊕(C[1]&B[0])). This example where the two overlapping bits are corrected in this way is merely illustrative. In general, any number of overlapping or intersecting multiplier output bits can be corrected using this method.

The examples above are related to integer or fixed-point multipliers. If desired, the disclosed techniques may optionally be extended to the floating-point context. Floating-point numbers are commonplace for representing real numbers in scientific notation in computing systems and are designed to cover a large numeric range and diverse precision requirements. The IEEE754 standard is commonly used for floating-point numbers. A floating-point number typically includes three different parts: (1) the sign of the floating-point number, (2) the exponent, and (3) the mantissa. Each of these parts may be represented by a binary number and, in the IEEE 754 format, have different bit sizes depending on the precision. For example, a single precision floating-point number requires 32 bits, which are distributed as follows: one sign bit, eight exponent bits, and 23 mantissa bits. As another example, a double precision floating-point number requires 64 bits, including one sign bit, 11 exponent bits, and 52 mantissa bits.

The sign of a floating-point number according to standard IEEE754 is represented using a single bit, where a "0" denotes a positive number and a "1" denotes a negative number. The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is 127. For example, a value of 140 for the exponent actually represents (140−127)=13, and a value of 100 represents (100−127)=−27. For double precision numbers, the exponent bias preferably is −1023.

As discussed above, according to the IEEE754 standard, the mantissa is a normalized number (i.e., it has no leading zeroes and represents the precision component of a floating point number). Because the mantissa is stored in binary format, the leading bit can either be a "0" or a "1", but for a normalized number it will always be a "1". Therefore, in a system where numbers are always normalized, the leading bit need not be stored and can be implied, effectively giving the mantissa one extra bit of precision. Thus, the single precision format effectively has 24 bits of precision (i.e., 23 mantissa bits plus one implied bit).

Figure 12:
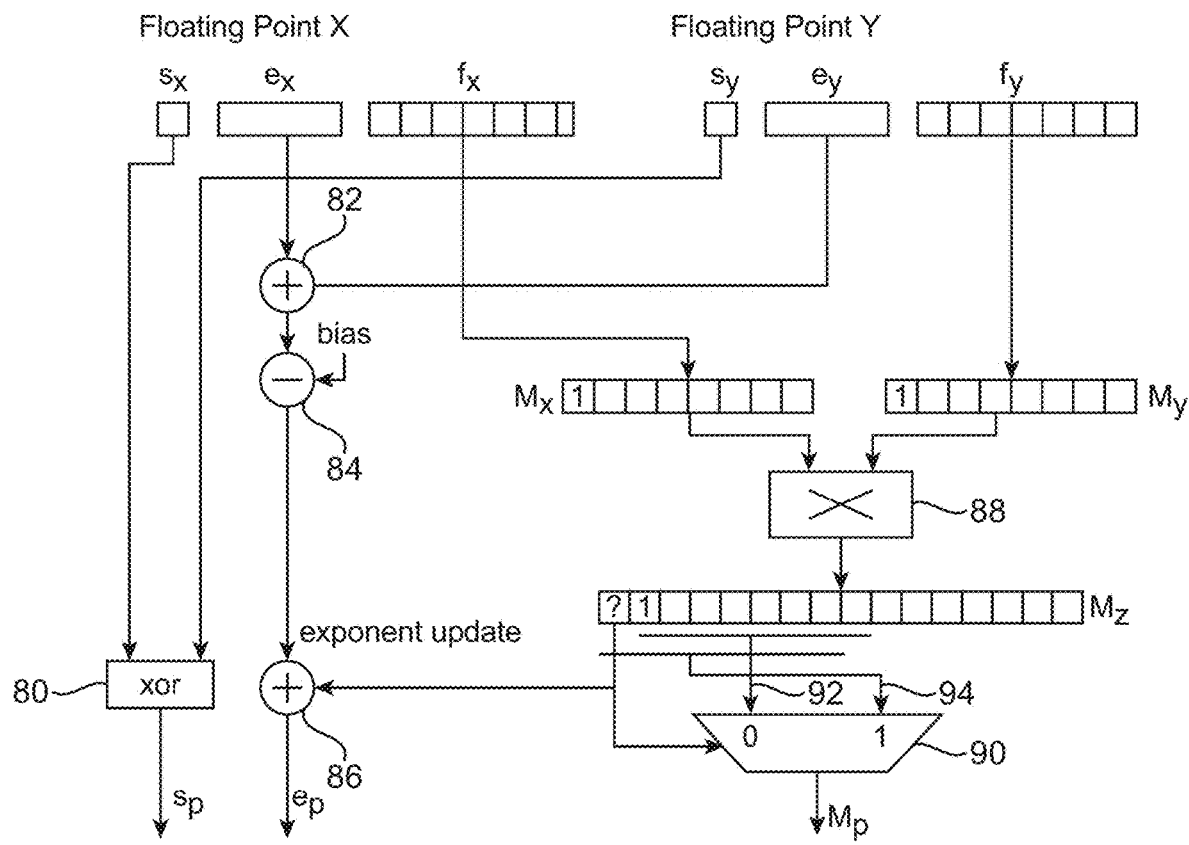
FIG. 12 is a diagram illustrating an illustrative floating-point multiplication operation in accordance with an embodiment.

FIG. 12 is a diagram illustrating an illustrative floating-point multiplication operation. FIG. 12 shows how to compute the product of a first floating-point number X and a second floating-point number Y. First floating-point number X has a sign bit $s_x$, exponent bits $e_x$, and fractional bits $f_x$. Second floating-point number Y has a sign bit $s_y$, exponent bits $e_y$, and fractional bits $f_y$. The fractional bits $f_x$ and $f_y$ are sometimes referred to as mantissa bits.

The signed bit of the resulting product ($s_p$) may be calculated by computing the XOR of $s_x$ and $s_y$ (e.g., using logic exclusive-OR circuit 80). The exponent bits of the resulting product $e_p$ may be calculated by adding together $e_x$ and $e_y$ (e.g., using adder circuit 82) and then subtracting an exponent bias (e.g., using adder circuit 84). As described above, IEEE754 single precision floating-point numbers have eight exponent bits and preferably have a negative bias of 127. As another example, IEEE754 double precision floating-point number have 11 exponent bits and preferably have a negative bias of 1023. Exponent bits $e_p$ may be optionally incremented by "1" (e.g., using adder circuit 86) if the product of the mantissas Mx and My overflows the interval [1,2).

Bits $f_x$ may have an implied leading "1", which collectively form the mantissa $M_x$ for the first floating-point number. Similarly, bits $f_y$ may also have an implied leading "1", which collectively form the mantissa $M_y$ for the second floating-point number. The two mantissas can be multiplied (e.g., using a mantissa multiplier circuit 88) to generate resulting mantissa product $M_z$. Mantissa product $M_z$ will also have an implied leading "1". Assuming $M_z$ does not overflow (the "?" bit of Mz equal to "0", which implies Mz in [1,2)), the requisite MSBs of $M_z$ will be passed through as mantissa $M_p$ of the product (e.g., using multiplexer 90, as indicated by signal path 92). If $M_z$ does overflow (i.e., if the "?" bit of $M_z$ is equal to a "1"), another set of MSBs of $M_z$ will be passed through to $M_p$ (e.g., using multiplexer, as indicated by signal path 94) while also updating exponent bits $e_p$. In particular, this disclosure will focus on the mantissa multiplier 88.

Figure 13A:
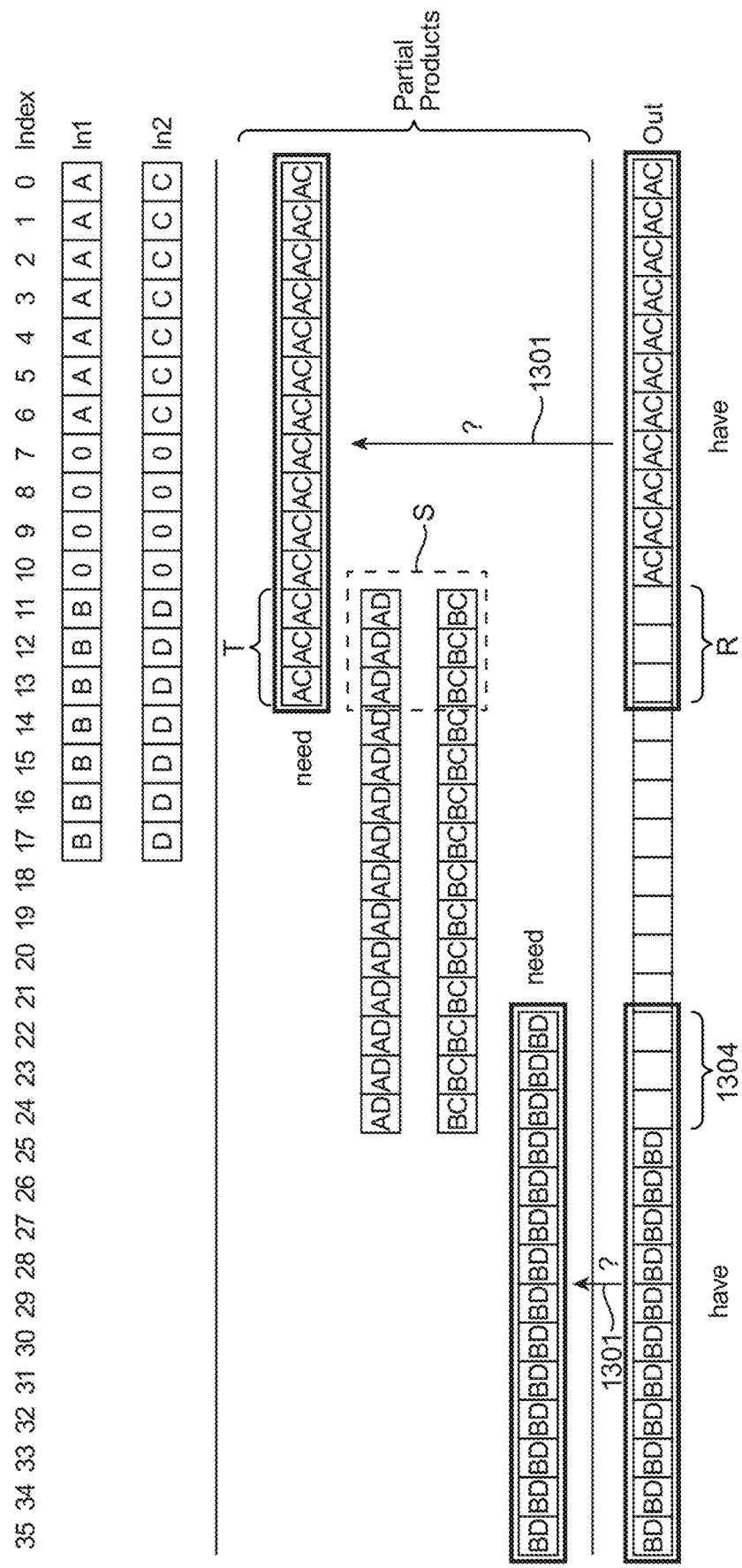
FIG. 13A is a diagram showing how an 18×18 multiplier can be used to support two separate floating-point mantissa multiplications in accordance with an embodiment.

FIG. 13A is a diagram showing how an 18×18 multiplier circuit within a DSP block can be used to support two separate 7-bit mantissa multiplications. To implement two independent 7×7 mantissa multipliers, indices [6:0] of In1 are configured to receive input signals A, indices [17:11] of In1 are configured to receive input signals B, indices [6:0] of In2 are configured to receive input signals C, and indices [17:11] of In2 are configured to receive input signals D. The remaining indices [10:7] of In1 and In2 are populated with zeroes. Configured in this way, the final output bits include contribution from four different partial products: partial product A*C that is generated at indices [13:0]; partial product B*D that is generated at indices [35:22]; partial product A*D that is generated at indices [24:11]; and partial product B*C that is also generated at indices [24:11].

As shown in FIG. 13A, we "have" the output bits, but we really "need" to back-calculate the bits of A*C and the bits of B*D (as indicated by arrows 1301). Regarding B*D, only the three LSBs will be impacted due to overlapping region 1304 (e.g., the MSBs of A*D and B*C can add to the three LSBs of B*D). However, since the normalized mantissa $M_p$ of B*D should have 7 bits, any pollution at the three mantissa LSBs will produce a fairly low error. In other words, the output bits can be used directly, either by truncating the 3 LSBs of B*D or optionally rounding those bits.

With regard to A*C, the three MSBs of A*C (denoted as "R" in FIG. 13A) will be impacted due to the partial overlap among partial products AC, AD, and BC at indices [13:11]. Unlike B*D where only the LSBs are affected, we will need to compute the actual MSB values of A*C (denoted as "T") since errors at the MSB locations are critical. To compute bits T from output bits R, we will need to determine the interfering bits from the three LSBs of A*D and B*C (collectively denoted as "S").

Assuming S can be computed in logic and since we have R available at the multiplier outputs [13:11], the needed T can be computed by finding T such that:

$$R = (S+T) \text{modulo } 8 \quad (2)$$

which is also shown in FIG. 13C. FIG. 13B is a diagram of an illustrative lookup table that satisfies equation (2), which can be used to find T when given S and R. The cost of implementing this is three ALMs (as an example).

Figure 13D:
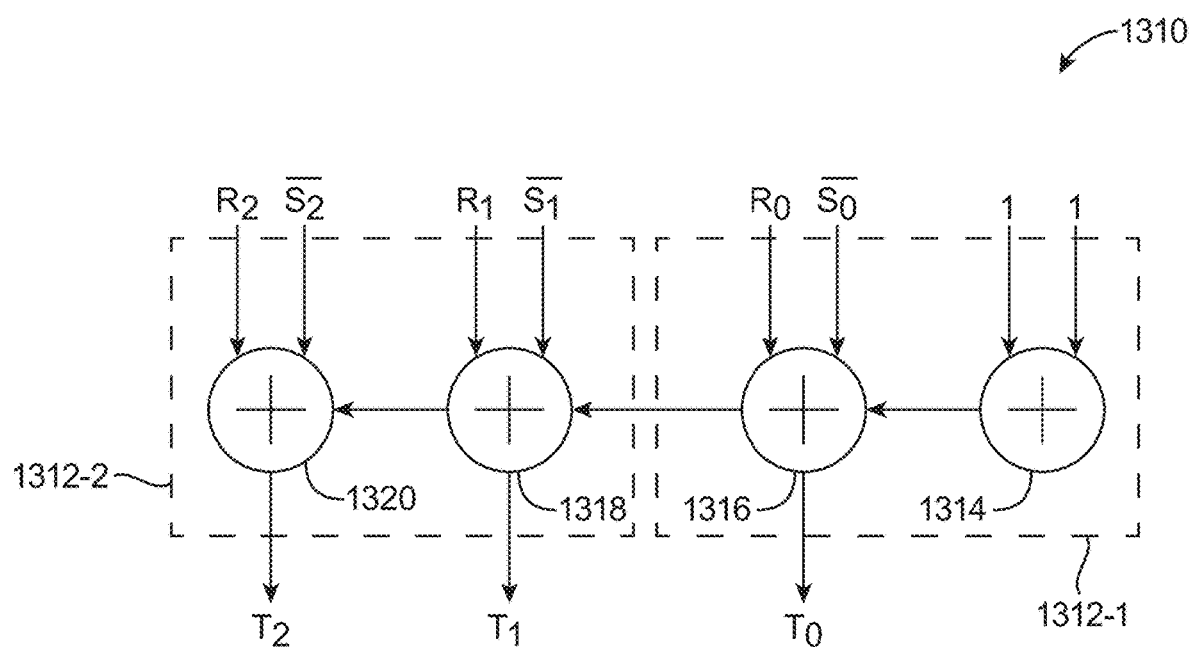
FIG. 13D is a diagram of illustrative adder circuit configured to compute the MSBs of the first mantissa result in accordance with an embodiment.

Alternatively, T might also be computed using a 4-bit adder (see, e.g., FIG. 13D). As shown in FIG. 13D, 4-bit adder circuit 1310 includes adders 1314, 1316, 1318, and 1320. Adders 1314 and 1316 are part of a first ALM 1312-1, whereas adders 1318 and 1320 are part of a second ALM coupled to the first ALM 1312-2. Adder 1314 is configured to receive two "1s" and has a carry output that is coupled to the carry input of adder 1316. Adder 1316 is further configured to receive R[0] and the inverted S[0], has a sum output on which T[0] is generated and has a carry output that is coupled to the carry input of adder 1318. Adder 1318 is further configured to receive R[1] and the inverted S[1], has a sum output on which T[1] is generated and has a carry output that is coupled to the carry input of adder 1320. Adder 1320 is further configured to receive R[2] and the inverted S[2], has a sum output on which T[2] is generated and has a carry output that can be ignored. Four-bit adder circuit 1310 configured in this way effectively implements R+!S+1, which is equal to (R−S) in two's complement.

Figure 13E:
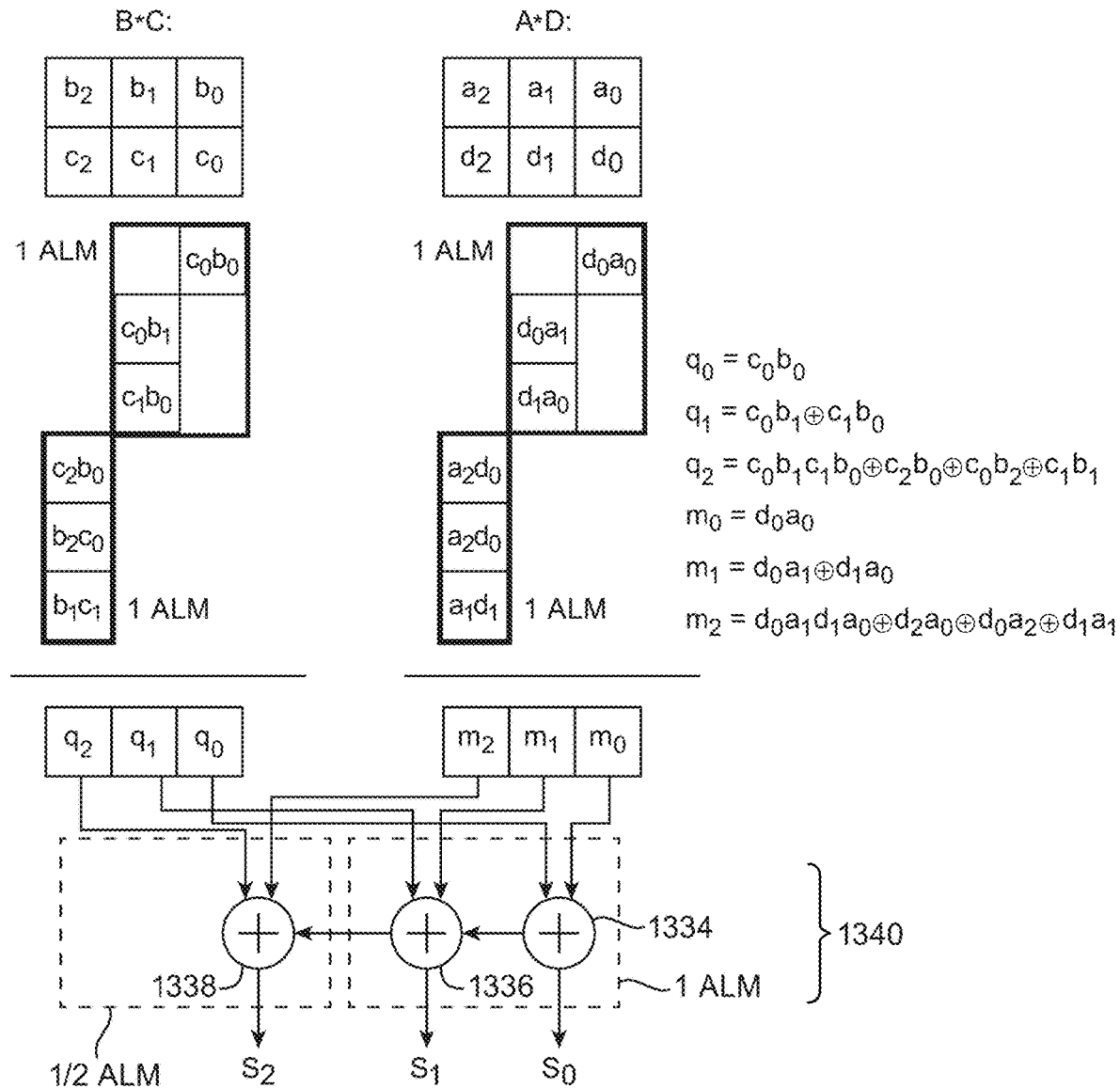
FIG. 13E is a diagram showing how to compute the least significant bits of the extraneous partial products in accordance with an embodiment.

Both the solutions of FIG. 13B and FIG. 13C for identifying bits T[2:0] require first obtaining bits S. FIG. 13E is a diagram showing how S can be computed. Referring briefly to FIG. 13A, S includes contribution from the three LSBs of partial product A*D and also the three LSBs of partial product B*C. Referring back to FIG. 13E, the three LSBs of partial product A*D are equal to m2, m1, and m0, where:

$$m0 = d0*a0 \quad (3)$$

$$m1 = d0*a1 \oplus d1*a0 \quad (4)$$

$$m2 = d0*a1*d1*a0 \oplus d2*a0 \oplus d0*a2 \oplus d1*a1 \quad (5)$$

where a2, a1, and a0 are the three LSBS of A, and wherein d2, d1, and d0 are the three LSBs of D. Similarly, the three LSBs of partial product B*C is equal to q2, q1, and q0, where:

$$q0 = c0*b0 \quad (6)$$

$$q1 = c0*b1 \oplus c1*b0 \quad (7)$$

$$q2 = c0*b1*c1*b0 \oplus c2*b0 \oplus c0*b2 \oplus c1*b1 \quad (8)$$

where b2, b1, and b0 are the three LSBS of B, and wherein c2, c1, and c0 are the three LSBs of C.

As shown in FIG. 13E, a 3-bit adder circuit 1340 includes adders 1334, 1336, and 1338. Adders 1334 and 1336 are part of a first ALM, whereas adder 1338 only occupies half of a second ALM coupled to the first ALM. Adder 1334 is configured to receive m0 and q0, has a sum output on which S[0] is generated and has a carry output that is coupled to the carry input of adder 1336. Adder 1336 is further configured to receive m1 and q1, has a sum output on which S[1] is generated and has a carry output that is coupled to the carry input of adder 1338. Adder 1338 is further configured to receive m2 and q2, has a sum output on which S[2] is generated and has a carry output that can be ignored.

The example of FIGS. 13A-13E in which a larger 18×18 multiplier is used to support two independent 7-bit mantissa multiplications is merely illustrative. If desired, the techniques described here may be extended to support two 8-bit mantissa multipliers, two 9-bit mantissa multipliers, two 6-bit mantissa multipliers, two 5-bit mantissa multipliers, or multiplications of other suitable mantissa widths.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Examples

The following examples pertain to further embodiments.

Example 1 is an integrated circuit, comprising: a multiplier circuit having a first input, a second input, and an output, wherein: the first input is configured to receive a first multiplicand and a second multiplicand; the second input is configured to receive a first multiplier and a second multiplier; the first multiplier is shared between the first and second multiplicands to generate at least a first product at the output of the multiplier circuit; and the second multiplier is shared between the first and second multiplicands to generate at least a second product at the output of the multiplier circuit.

Example 2 is the integrated circuit of example 1, wherein there is optionally no overlap between the first and second products.

Example 3 is the integrated circuit of any one of examples 1-2, wherein: the first input is optionally further configured to receive a third multiplicand and a fourth multiplicand; the first multiplier is optionally also shared with the third and fourth multiplicands; and the second multiplier is optionally also shared with the third and fourth multiplicands.

Example 4 is the integrated circuit of any one of examples 1-3, wherein the multiplier circuit is optionally configured to implement a complex multiplication operation, and wherein the first and second products are optionally used to compute a real part of the complex multiplication operation.

Example 5 is the integrated circuit of any one of examples 1-3, wherein: the first multiplicand and the second multiplier are optionally used to compute a first partial product; the second multiplicand and the first multiplier are optionally used to compute a second partial product; and a sum of the first and second partial products are optionally generated at the output of the multiplier circuit.

Example 6 is the integrated circuit of example 5, wherein the sum of the first and second partial products optionally overflows into the second product.

Example 7 is the integrated circuit of example 6, wherein the multiplier circuit is optionally configured to correct the second product by accounting for the overflow from the sum of the first and second partial products.

Example 8 is the integrated circuit of example 7, wherein correcting the second product by accounting for the overflow from the sum optionally comprises performing an exclusive-OR operation and a subtraction operation.

Example 9 is the integrated circuit of example 6, wherein the multiplier circuit is optionally configured to only partially correct the second product using a subtractor that is smaller than the precision of the second product.

Example 10 is the integrated circuit of example 1, wherein: the first multiplier is optionally shared between the first and second multiplicands to further generate a first partial product; the second multiplier is optionally shared between the first and second multiplicands to further generate a second partial product; and the first and second partial products only partially overlap to produced bits at the output of the multiplier circuit.

Example 11 is the integrated circuit of any one of examples 1-5, wherein the first and second multiplicands are optionally separated by a sufficient number of zeroes so that a first set of products resulting from the sharing of the first multiplier between the first and second multiplicands do not overlap with one another, and wherein the first and second multipliers are optionally separated by an adequate number of zeroes so that a second set of products resulting from the sharing of the second multiplier between the first and second multiplicands do not overlap with the first set of products.

Example 12 is the integrated circuit of any one of examples 1-11, wherein the second multiplicand comprises a most significant multiplicand, wherein the second multiplier comprises a most significant multiplier, and wherein only the most significant multiplicand and the most significant multiplier are optionally signed while the first multiplicand and the first multiplier are unsigned.

Example 13 is an integrated circuit, comprising: a first multiplier circuit having a first input configured to receive first and second multiplicands and a second input configured to receive a first multiplier and a first subset of a second multiplier; and a second multiplier circuit having a first input configured to receive the first and second multiplicands and a second input configured to receive a third multiplier and a second subset of the second multiplier that is different than the first subset.

Example 14 is the integrated circuit of example 13, wherein the first multiplier and the second multiplier optionally have the same number of bits.

Example 15 is the integrated circuit of any one of examples 13-14, wherein outputs of the first and second multiplier circuits are optionally combined to compute a first product of the first multiplicand and the second multiplier and to compute a second product of the second multiplicand and the second multiplier.

Example 16 is the integrated circuit of any one of examples 13-15, wherein the first multiplier circuit optionally directly outputs a first product of the first multiplicand and the first multiplier and also directly outputs a second product of the second multiplicand and the first multiplier.

Example 17 is the integrated circuit of example 16, wherein the second multiplier circuit optionally directly outputs a third product of the first multiplicand and the third multiplier and also directly outputs a fourth product of the second multiplicand and the third multiplier.

Example 18 is the integrated circuit of any one of examples 16-17, wherein there is optionally no overflow and no overlap between the first and second products.

Example 19 is an integrated circuit, comprising: a multiplier circuit operable to compute two floating-point mantissa multiplication operations, wherein: the multiplier circuit has a first input configured to receive first mantissa bits and second mantissa bits and has a second input configured to receive third mantissa bits and fourth mantissa bits; and the multiplier circuit is configured to compute a first partial product of the first and third mantissa bits, a second partial product of the first and fourth mantissa bits, a third partial product of the second the third mantissa bits, and a fourth partial product of the second and fourth mantissa bits.

Example 20 is the integrated circuit of example 19, wherein the second and third partial products optionally interfere with least significant bits (LSBs) of the fourth partial product to form bits at an output of the multiplier circuit, and wherein the interference is tolerable and need not be corrected.

Example 21 is the integrated circuit of any one of examples 19-20, wherein the second and third partial products optionally interfere with most significant bits (MSBs) of the first partial product to form bits at the output of the multiplier circuit, and wherein the interference is not tolerable and has to be corrected.

Example 22 is the integrated circuit of example 21, optionally further comprising a lookup table configure to determine the MSBs of the first partial product based on least significant bits (LSBs) of the second and third partial products.

Example 23 is the integrated circuit of example 21, optionally further comprising an adder circuit configure to determine the MSBs of the first partial product based on least significant bits (LSBs) of the second and third partial products.

Example 24 is the integrated circuit of example 23, optionally further comprising an additional adder circuit configured to compute the sum of the LSBs of the second and third partial products.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
a multiplier circuit having a first input, a second input, and an output, wherein:
the first input is configured to receive a first multiplicand and a second multiplicand;
the second input is configured to receive a first multiplier and a second multiplier;
the first multiplier is shared between the first and second multiplicands to generate at least a first set of products, wherein the first and second multiplicands are separated by a sufficient number of zeroes so that the first set of products do not overlap with one another; and
the second multiplier is shared between the first and second multiplicands to generate at least a second set of products.

2. The integrated circuit of claim 1, wherein there is no overlap between the first and second sets of products.

3. The integrated circuit of claim 1, wherein:
the first input is further configured to receive a third multiplicand and a fourth multiplicand;
the first multiplier is also shared with the third and fourth multiplicands; and
the second multiplier is also shared with the third and fourth multiplicands.

4. The integrated circuit of claim 1, wherein the multiplier circuit is configured to implement a complex multiplication operation, and wherein the first and second products are used to compute a real part of the complex multiplication operation.

5. The integrated circuit of claim 1, wherein:
the first multiplicand and the second multiplier are used to compute a first partial product;
the second multiplicand and the first multiplier are used to compute a second partial product; and
a sum of the first and second partial products are generated at the output of the multiplier circuit.

6. An integrated circuit, comprising:
a multiplier circuit having a first input, a second input, and an output, wherein:
the first input is configured to receive a first multiplicand and a second multiplicand;
the second input is configured to receive a first multiplier and a second multiplier;
the first multiplier is shared between the first and second multiplicands to generate at least a first product at the output of the multiplier circuit;
the second multiplier is shared between the first and second multiplicands to generate at least a second product at the output of the multiplier circuit;
the first multiplicand and the second multiplier are used to compute a first partial product;
the second multiplicand and the first multiplier are used to compute a second partial product;
a sum of the first and second partial products is generated at the output of the multiplier circuit; and
the sum of the first and second partial products overflows into the second product.

7. The integrated circuit of claim 6, wherein the multiplier circuit is configured to correct the second product by accounting for the overflow from the sum of the first and second partial products.

8. The integrated circuit of claim 7, wherein correcting the second product by accounting for the overflow from the sum comprises performing an exclusive-OR operation and a subtraction operation.

9. The integrated circuit of claim 6, wherein the multiplier circuit is configured to only partially correct the second product using a subtractor that is smaller than the precision of the second product.

10. An integrated circuit, comprising:
a multiplier circuit having a first input, a second input, and an output, wherein:
the first input is configured to receive a first multiplicand and a second multiplicand;
the second input is configured to receive a first multiplier and a second multiplier;
the first multiplier is shared between the first and second multiplicands to generate a first partial product;
the second multiplier is shared between the first and second multiplicands to generate a second partial product; and
the first and second partial products only partially overlap to produced bits at the output of the multiplier circuit.

11. The integrated circuit of claim 1, wherein the first and second multipliers are separated by an adequate number of zeroes so that the second set of products do not overlap with the first set of products.

12. The integrated circuit of claim 1, wherein the second multiplicand comprises a most significant multiplicand, wherein the second multiplier comprises a most significant multiplier, and wherein only the most significant multiplicand and the most significant multiplier are signed while the first multiplicand and the first multiplier are unsigned.

13. An integrated circuit, comprising:
a first multiplier circuit having a first input configured to receive first and second multiplicands and a second input configured to receive a first multiplier and a first subset of a second multiplier; and
a second multiplier circuit having a first input configured to receive the first and second multiplicands and a second input configured to receive a third multiplier and a second subset of the second multiplier that is different than the first subset.

14. The integrated circuit of claim 13, wherein the first multiplier and the second multiplier have the same number of bits.

15. The integrated circuit of claim 13, wherein outputs of the first and second multiplier circuits are combined to compute a first product of the first multiplicand and the second multiplier and to compute a second product of the second multiplicand and the second multiplier.

16. The integrated circuit of claim 13, wherein the first multiplier circuit directly outputs a first product of the first multiplicand and the first multiplier and also directly outputs a second product of the second multiplicand and the first multiplier.

17. The integrated circuit of claim 16, wherein the second multiplier circuit directly outputs a third product of the first multiplicand and the third multiplier and also directly outputs a fourth product of the second multiplicand and the third multiplier.

18. The integrated circuit of claim 16, wherein there is no overflow and no overlap between the first and second products.

19. An integrated circuit, comprising:
a multiplier circuit operable to compute two floating-point mantissa multiplication operations, wherein:
the multiplier circuit has a first input configured to receive first mantissa bits and second mantissa bits and has a second input configured to receive third mantissa bits and fourth mantissa bits; and
the multiplier circuit is configured to compute a first partial product of the first and third mantissa bits, a second partial product of the first and fourth mantissa bits, a third partial product of the second the third mantissa bits, and a fourth partial product of the second and fourth mantissa bits, wherein the second partial product at least partially overlaps with the third partial product.

20. The integrated circuit of claim 19, wherein the second and third partial products interfere with least significant bits (LSBs) of the fourth partial product to form bits at an output of the multiplier circuit.

21. The integrated circuit of claim 19, wherein the second and third partial products interfere with most significant bits (MSBs) of the first partial product to form bits at the output of the multiplier circuit.

22. The integrated circuit of claim 21, further comprising a lookup table configure to determine the MSBs of the first partial product based on least significant bits (LSBs) of the second and third partial products.

23. The integrated circuit of claim 21, further comprising an adder circuit configure to determine the MSBs of the first partial product based on least significant bits (LSBs) of the second and third partial products.

24. The integrated circuit of claim 23, further comprising an additional adder circuit configured to compute the sum of the LSBs of the second and third partial products.

* * * * *